L

(12) United States Patent
Ramakrishnan et al.

(10) Patent No.: US 8,934,202 B2
(45) Date of Patent: Jan. 13, 2015

(54) METHODS AND DEVICES FOR EXTRACTING OFF-TRACK MOTION USING MICROACTUATORS

(75) Inventors: Narayanan Ramakrishnan, Bloomington, MN (US); Stefan Alexander Weissner, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 530 days.

(21) Appl. No.: 13/326,575

(22) Filed: Dec. 15, 2011

(65) Prior Publication Data
US 2013/0152695 A1  Jun. 20, 2013

(51) Int. Cl.
*G11B 5/56* (2006.01)
*G11B 5/596* (2006.01)
(52) U.S. Cl.
USPC .......... 360/294.4; 360/294.3; 360/78.05; 360/75; 360/78.12
(58) Field of Classification Search
CPC .. G11B 5/5552; G11B 5/4826; G11B 5/4833; G11B 5/4873; G11B 5/59627; G11B 5/596; G11B 5/5556
USPC ........... 360/75, 78.05, 294.4, 78.12, 294.3
See application file for complete search history.

(56) References Cited

U.S. PATENT DOCUMENTS

| | | | |
|---|---|---|---|
| 6,100,623 A | 8/2000 | Huang et al. | |
| 6,621,653 B1 | 9/2003 | Schirle | |
| 6,922,305 B2 * | 7/2005 | Price | 360/78.12 |
| 7,375,911 B1 * | 5/2008 | Li et al. | 360/75 |
| 7,411,752 B2 | 8/2008 | Angelo et al. | |
| 7,502,191 B2 * | 3/2009 | Oh et al. | 360/75 |
| 7,508,634 B2 * | 3/2009 | Yao et al. | 360/294.4 |
| 2002/0067565 A1 * | 6/2002 | Kelemen | 360/75 |
| 2002/0101681 A1 * | 8/2002 | He et al. | 360/78.05 |
| 2003/0011914 A1 * | 1/2003 | Angelo et al. | 360/25 |
| 2005/0146807 A1 * | 7/2005 | Huang et al. | 360/78.05 |
| 2014/0139953 A1 * | 5/2014 | Hatch | 360/234.5 |

OTHER PUBLICATIONS

Arjan P. Teerhuis, et. al., Reduction of flow-induced suspension vibrations in a hard disk drive by dual-stage suspension control, IEEE Transactions on Magnetics, 2003, vol. 39, N. 9.
Roberto Horowitz, et. al., Dual-stage servo systems and vibration compensation in computer hard drives, 3rd IFAC symposium on Mechatronic systems, Sep. 6-8, 2004, Sydney, Australia.
Yunfeng Li, et. al., Active vibration control of a PZT actuated suspension in hard disk drives, Proc. American Control Conference, May 8-10, 2002, Anchorage, AK.

\* cited by examiner

*Primary Examiner* — Lisa Caputo
*Assistant Examiner* — Jonathan Dunlap
(74) *Attorney, Agent, or Firm* — Braden Katterheinrich

(57) ABSTRACT

In certain embodiments, an apparatus includes a first piezoelectric (PZT) element poled in the same direction as a second PZT element. The first and second PZT elements are configured to be driven while simultaneously sensing motion. The apparatus further includes a circuit configured to add outputs of the first and second PZT elements, extract the sensed motion, and detect off-track motion from the extracted sensed motion.

14 Claims, 7 Drawing Sheets

METHODS AND DEVICES FOR EXTRACTING OFF-TRACK MOTION USING MICROACTUATORS

SUMMARY

Certain embodiments of the present invention are generally directed to devices and methods for using microactuators to extract off-track motion.

In certain embodiments, an apparatus includes a first piezoelectric (PZT) element poled in the same direction as a second PZT element. The first and second PZT elements are configured to be driven while simultaneously sensing motion. The apparatus further includes a circuit configured to add outputs of the first and second PZT elements, extract the sensed motion, and detect off-track motion from the extracted sensed motion.

DETAILED DESCRIPTION

The present disclosure relates to microactuators using magnetostrictive, piezomagnetic, piezoelectric (PZT), and other such devices that show a reciprocal response between deformation (strain) and a n applied electrical or magnetic field. As will be recognized by those skilled in the art, many devices can be provisioned with microactuators such as x-y scanning tables, atomic force microscopes, semiconductor inspection devices, and data storage devices. Data storage devices, like hard disc drives, can be provisioned with a rotatable medium to which data are stored along a number of concentric tracks. A head gimbal assembly (HGA) allows precise positioning of a data read/write transducer adjacent the tracks by allowing the transducer to gimbal along multiple axes to follow the topography of the media surface. However, as the track density increases, it becomes more difficult to stay on-track during read/write operations.

Microactuators are proposed for use with HGAs to enhance the ability of a data storage device to stay on-track during read/write operations. PZT-based microactuators can be driven to actuate and can also sense off-track motion like HGA bending, torsion, and sway among other disturbances and disc modes. Attempts to use microactuators in data storage devices have used model-based estimators to simulate nominal characteristics of PZTs to control/sense PZTs, but these attempts use multiple components including several amplifiers.

Certain embodiments of the present disclosure are accordingly directed to devices and methods for using a microactuator to simultaneously drive the microactuator and sense off-track motion. The simultaneous detection and actuation capability affords a feedback control with minimal delay or phase-loss, thereby providing a high bandwidth. The enhanced head-motion sensing bandwidth combined with the high-bandwidth actuation capability of the present disclosure is valuable for servo track-following at low track-pitch and high areal-density levels of current and future recording subsystems. In certain other uses, such as disk-motion sensing, the extracted off-track motion can also be used for feedforward control to mitigate the effects of disk modes on head position error. As explained below, the devices and methods are easy to implement and operate in multiple applications, and can be configured to reduce or eliminate many of the issues associated with current designs.

Figure 1:
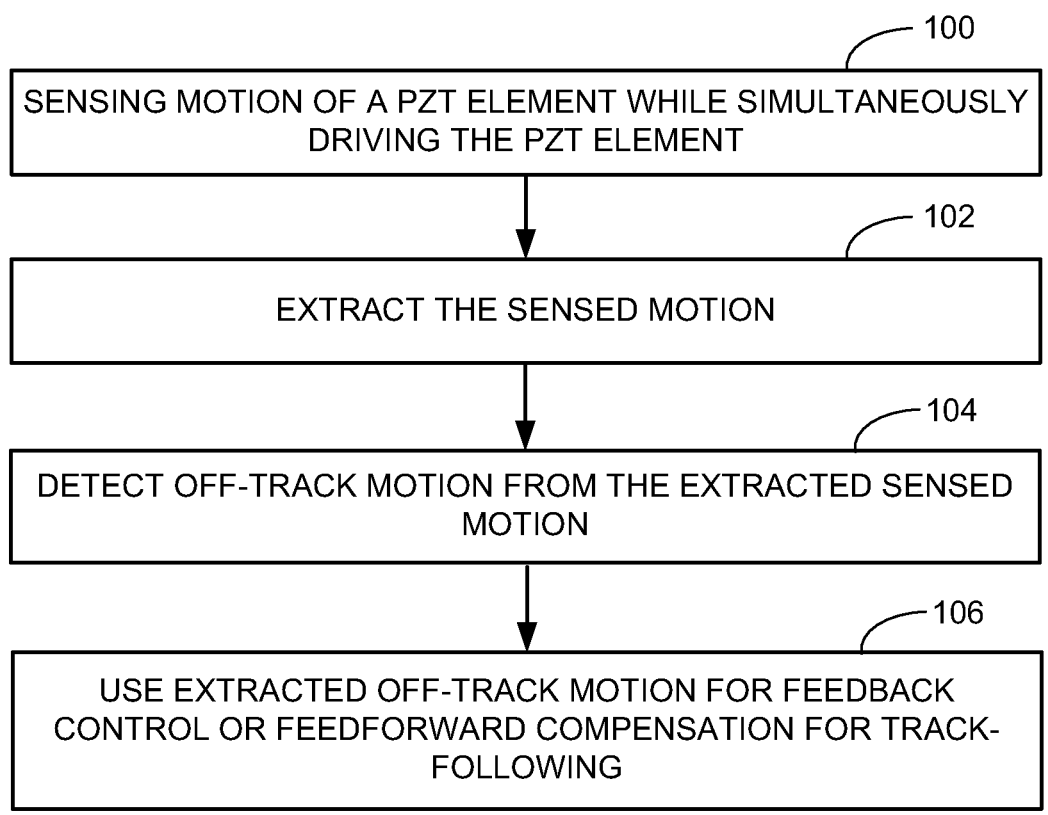
FIG. 1 provides a process carried out in accordance with certain embodiments of the present disclosure.

FIG. 1 provides a process carried out in accordance with certain embodiments of the present disclosure. In short, the process includes sensing motion of a piezoelectric (PZT) element while simultaneously driving the PZT element (step 100); extracting the sensed motion (step 102); and detecting off-track motion from the extracted, sensed motion (step 104). The extracted off-track motion can then be used for feedback control or feedforward compensation in the case of disk modes for track-following of the recording head (step 106)

PZT elements can output composite signals that are composed of two signals: driving signals for actuating the PZT elements and sensing signals for sensing motion of an HGA. Both signals contain frequency components that are mostly identical, thereby making it difficult to identify or separate each type of signal individually in a composite signal that includes both signals. As a result, simultaneously driving a PZT element and sensing using the PZT element is difficult and is further frustrated by noise.

Figure 2:
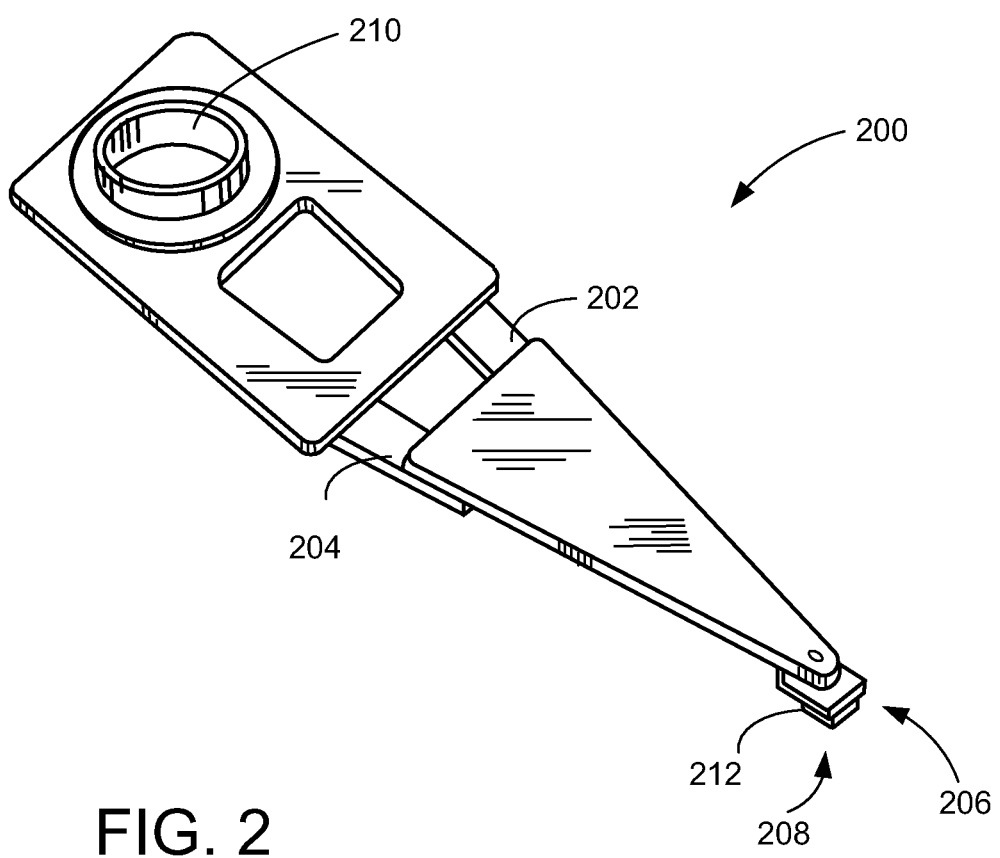
FIG. 2 provides an isometric view of a suspension portion of a disc drive, in accordance with certain embodiments of the present disclosure.

FIG. 2 provides an isometric view of an exemplary suspension 200 portion of a disc drive. The suspension 200 is constructed to utilize triple-stage actuation and/or sensing. The first stage of actuation is performed by a voice coil motor, which rotates the suspension 200 around an axis of the suspension's hub 210. For a second stage of actuation/sensing, the suspension 200 further includes a first set of PZT elements (or microactuators) 202 and 204 located at or near a middle portion of the suspension 200. For a third stage of actuation/sensing, the suspension 200 further includes a second set of PZT elements (or microactuators) 206 and 208 located at or near a distal end and bottom-side of the suspension 200. The first set of PZT elements 202 and 204 drive and sense over a larger range than the second set of PZT elements 206 and 208 because of the first set's location near the middle of the suspension 200. The second set of PZT elements 206 and 208 are located between the suspension 200 and a read/write head 212, thereby permitting a smaller range of motion/sensing but with increased precision and increased actuation bandwidth.

Figure 3:
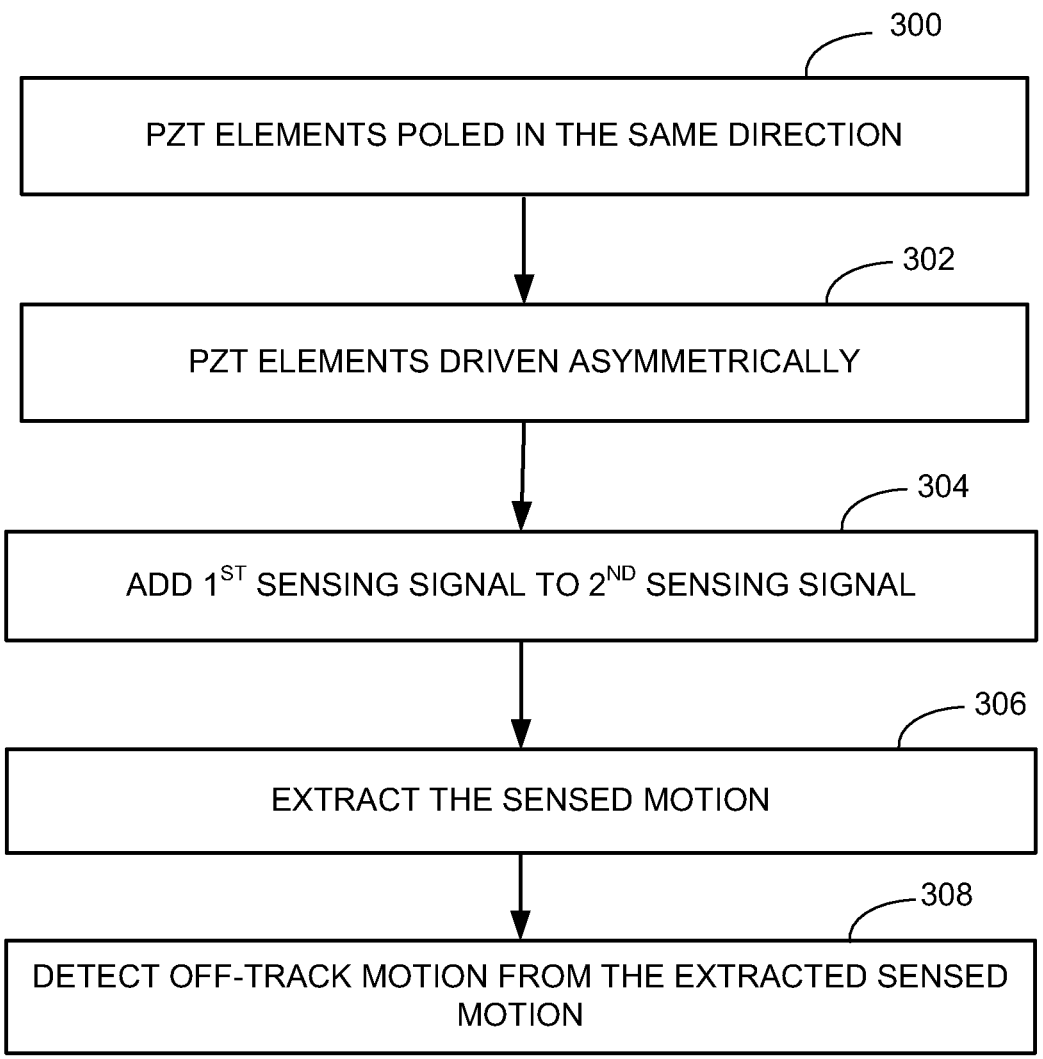
FIG. 3 provides a process carried out in accordance with certain embodiments of the present disclosure.
Figure 4:
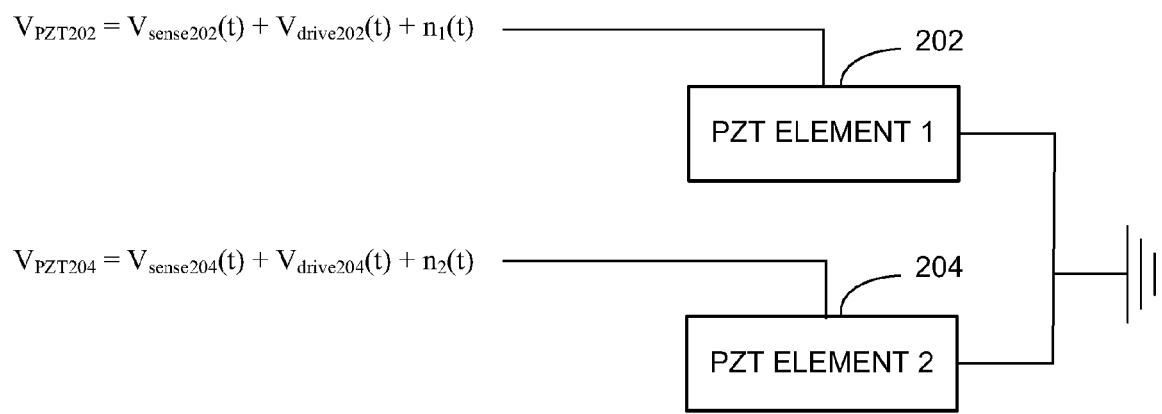
FIG. 4 provides a circuit scheme, in accordance with certain embodiments of the present disclosure.
Figure 5:
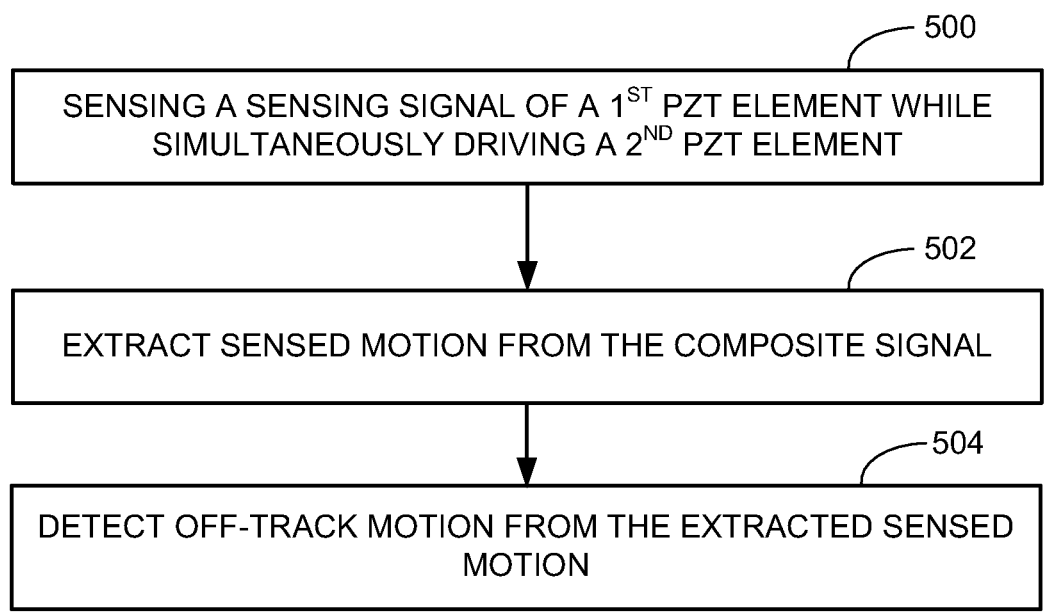
FIG. 5 provides a process carried out in accordance with certain embodiments of the present disclosure.

FIG. 3 provides process carried out in accordance with certain embodiments of the present disclosure. Using the first set of PZT elements 202 and 204 as an example, equations [1] and [2] listed below represent the makeup of each PZT element's composite signal (as shown in FIG. 4). These equations are provided to simplify explanation, are not limiting, and do not bind the application to any theory.

$$V_{PZT202} = V_{sense202}(t) + V_{drive202}(t) + n_1(t) \qquad \text{Equation 1}$$

$$V_{PZT204} = V_{sense204}(t) + V_{drive204}(t) + n_2(t) \qquad \text{Equation 2}$$

Where $V_{PZT}$ is a PZT element's composite signal, $V_{sense}$ is a PZT element's sensing signal, $V_{drive}$ is a PZT element's drive signal, n is noise, and all of these signals are a function of (t)

time. In certain embodiments, the PZT elements 202 and 204 can be poled in the same direction (step 300). In this case, the PZT elements 202 and 204 are driven asymmetrically (step 302) and each PZT element's driving signal is equal to the negative of each other (e.g., $V_{drive202}(t)=-V_{drive204}(t)$). The sensing signal can further be decomposed into symmetric and asymmetric components, as shown in Equations [3] and [4].

$$V_{sense202}(t)=V_{sense202,symm}(t)+V_{sense202,asymm}(t) \quad \text{Equation 3}$$

$$V_{sense204}(t)=V_{sense204,symm}(t)+V_{sense204,asymm}(t) \quad \text{Equation 4}$$

Assuming mirror symmetry due to the PZT elements being identical and identically and symmetrically mounted on the suspension, Equation [5] results when Equations [1] and [2] are added. As shown in Equation [5], the driving signals are eliminated when the composite signals are added.

$$V_{PZT202}(t)+V_{PZT204}(t)=2V_{sense,asymm}(t)+n(t) \quad \text{Equation 5}$$

As shown in Equation [5], the sensing signal can be extracted from the composite signal (step 306) and isolated from the driving signal, thereby permitting the ability to drive a PZT element or set of PZT elements and simultaneously sense motion, for example, off-track motion in a disc drive or other metrology environments (step 308). In this case, the PZT elements act in tandem in symmetric mode to provide actuation while this arrangement can be used to sense off-track motion components due to asymmetric HGA modes such as suspension sway, suspension torsion, asymmetric disk modes, etc.

In the event of large noise amplitudes the signal-to-noise ratio can be degraded. Generally, the common-mode noise in the commonly shared pre- and post-amplification circuitry constitutes the largest portion of the noise (n(t)). One way to cancel the common-mode noise component from the composite signal would be obtain a differential signal as provided below. A third passive PZT element identical in physical form with the other (active) PZT elements can be mounted on a portion of the suspension such as a suspension baseplate, which is not subject to the higher-frequency disturbances (windage-induced response of suspension load-beam, gimbal, etc.). No driving signal would be applied to this passive or reference PZT element. The sensed output from the third passive PZT element, after suitable high-pass filtering (e.g., above 500 Hz), can then be subtracted from $V_{PZT202}(t)+V_{PZT204}(t)$ (obtained from Eq. [5]) to obtain a reduced-noise off-track motion signal.

Another approach to filtering out the common-mode noise includes one or a combination of frequency-domain or state-space-based filters, depending on the nature of the noise. In the general case of the noise (n(t)) being non-stationary and colored, Kalman filtering could be applied; Kalman filtering being a recursive filter that estimates an internal state of a linear dynamic system from a series of measurements. This approach would eliminate the need for a third PZT element to cancel out common-mode noise. The filtering approach to be used be can be based on a determination of the noise spectrum and the approaches in general can range from linear to non-linear filters and from simple frequency domain-based approaches such as low-pass or band-pass filtering to more sophisticated state-space-based approaches including Kalman filtering techniques.

In certain embodiments, the PZT elements 202 and 204 can be poled in opposite directions. In this case, the PZT elements 202 and 204 are driven symmetrically and each PZT element's driving signal is equal to each other (e.g., $V_{drive202}(t)=V_{drive204}(t)$). The sensing signal can further be decomposed into symmetric and asymmetric components, as shown in Equations [6] and [7].

$$V_{sense202}(t)=V_{sense202,symm}(t)+V_{sense202,asymm}(t) \quad \text{Equation 6}$$

$$V_{sense204}(t)=-V_{sense204,symm}(t)+V_{sense204,asymm}(t) \quad \text{Equation 7}$$

Assuming mirror symmetry as defined earlier, Equation [8] results when Equations [1] and [2] are added. As shown in Equation [8], both the common-mode noise and the driving signals are eliminated when the composite signals are added.

$$V_{PZT202}(t)+V_{PZT204}(t)=2V_{sense,symm}(t)+n_2(t), \quad \text{Equation 8}$$

Where $|n_2(t)|<<|n(t)|$.

In this case, the PZT elements act in tandem in an asymmetric mode to provide actuation. Further, this arrangement can be used to sense off-track motion due to symmetric HGA modes such as HGA bending and symmetric disk modes, etc.

The embodiments outlined above assume two assumptions, namely (a) that the two driving signals are equal in magnitude at all times and (b) mirror symmetry of the PZT elements as defined earlier. However in practice, electrical delays, control errors and physical differences in the PZT elements would result in the driving signals being not exactly equal in magnitude at all times. Further asymmetries in the PZT elements and the HGA structure by design and/or due to manufacturing process variations would result in different actuation gains on the two PZT elements, which in turn may use differently scaled input signals to the PZTs. Therefore, a small residual of the driving signal that is correlated to the sensing signal is likely to present itself as a colored noise in the resultant sensing signal. As mentioned earlier, various filtering techniques including Kalman filters can be used to filter out the noise from the signal and therefore optimize signal-to-noise ratio.

Returning to the suspension 200 of FIG. 2, in certain embodiments and during certain operations, one PZT element 202 or 204 can be used solely for sensing while the other PZT element 202 or 204 can be used for sensing and driving/actuation (block 500). For example, during track-follow operations, the read/write head 212 typically does not need to travel over relatively long distances. Track-follow operations occur when an HGA is attempting to follow or stay in-line with data tracks, and seek-settle operations occur when the HGA is attempting to travel from one data track to another. As such, during track-follow operations, it is sufficient to utilize only one PZT element for driving/displacement while simultaneously utilizing the other PZT element for sensing. For seek-settle operations, larger displacements are typically used, therefore both PZT elements 202, 204 should be configured to simultaneously drive and sense. In either operation, the sensing signal can be extracted from the composite signal (block 502) and isolated from the driving signal, thereby permitting the ability to drive a PZT element or set of PZT elements and simultaneously sense motion, for example, off-track motion in a disc drive or other metrology environments (block 504).

One or both PZT elements may be dual-mode, i.e., used for both sensing and actuation, For example, one PZT element could always operate in driving mode while the other PZT element could switch between sensing and actuation modes when going from track-following or post-seek settling mode to a long-stroke seek operation. In this case, separate interconnects for the sensing and driving signals may be used on a pre-amplifier as well as the dual-mode PZT element that switches between driving and sensing modes. Alternatively, the pre-amplifier may have switching circuitry to change modes on the dual-mode PZT element between sensing and actuation.

Figure 6:
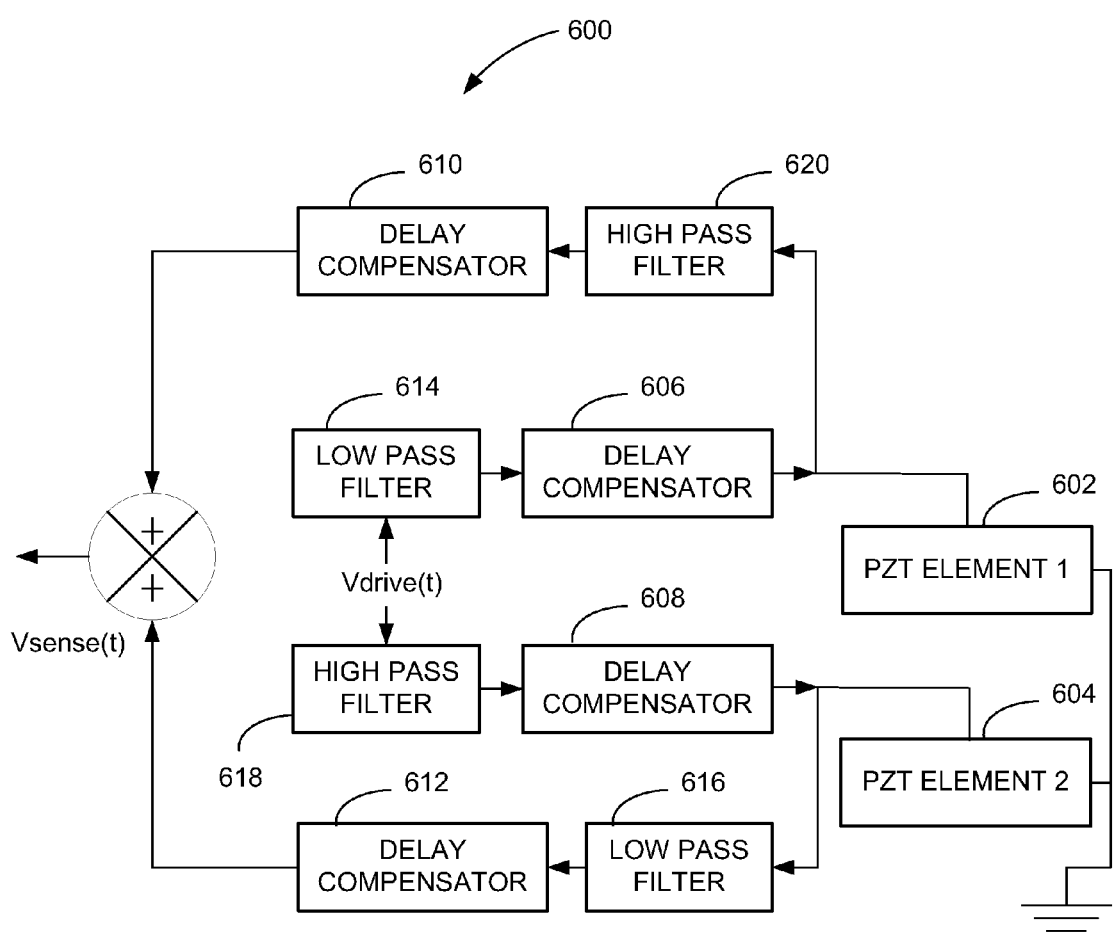
FIG. 6 provides a circuit diagram, in accordance with certain embodiments of the present disclosure.

FIG. 6 provides a circuit diagram 600, in accordance with certain embodiments of the present disclosure. The circuit 600 includes a first PZT element 602; second PZT element 604; four delay compensators 606, 608, 610, 612; two low pass filters 614, 616; and two high pass filters 618, 620. Suitable filtering/compensation schemes are applied to driving and sensing signals to separate each signal in frequency content for each PZT element 602, 604; thereby enabling the sensing signals from each PZT to be isolated from the driving signals.

A driving signal input ($V_{drive}(t)$) is divided into a low-frequency band portion by a first low-pass filter 614 and a high-frequency band portion by a first high-pass filter 618. Each filtered signal is passed through a delay compensator 606, 608 to correct for time lags and/or phase loss due to filtering. The delay compensators also match the phases of the high and low-frequency portions of the driving signal. The delay or phase loss can be largely deterministic so it possible to compensate for phase loss and mismatch between the two frequency bands of signals in a deterministic way using a scheme that can be determined apriori. The filtered signals are passed separately through the PZT elements 602, 604.

The reciprocal or complementary operation of the previous operation is carried out on each PZT element's sensing signal output ($V_{sense}(t)$) to extract the high and low-frequency portions of the sensing signals and to combine both portions to generate composite sensing signals that are isolated from the driving signals. Applying the described circuit and operations allows simultaneous actuation and off-track motion sensing using the first and second PZT elements 602, 604 in tandem, thereby enabling higher actuation stroke and off-track motion sensing. Further, the high pass filters 618, 620 could be substituted with band-pass filters with an upper cut-off frequency appropriately chosen to retain frequency components related to the various HGA and disk modes while filtering out the high-frequency noise components. This would result in enhanced signal-to-noise ratio. The different filtering operations can be done using a variety of techniques ranging from FFT-based filtering to continuous or discrete wavelet-based filtering that can be adaptively tuned.

Figure 7:
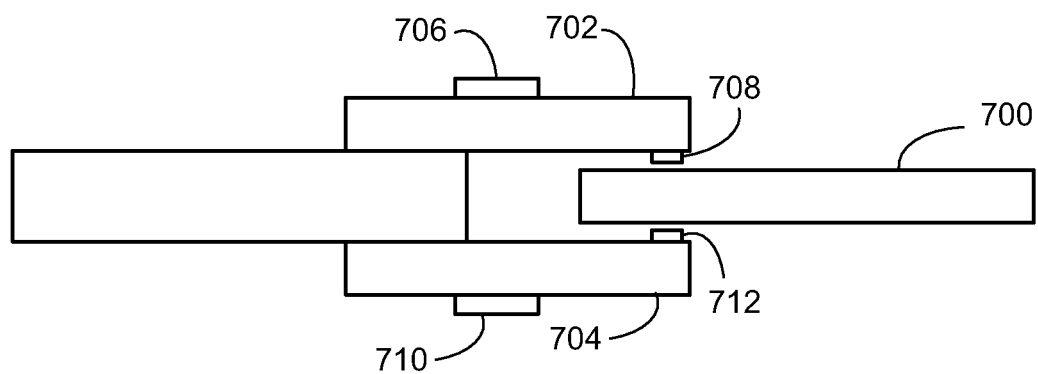
FIG. 7 provides a side view of a suspension portion of a disc drive, in accordance with certain embodiments of the present disclosure.

FIG. 7 provides a side view of a magnetic recording disk 700 and first and second suspensions 702, 704. Both the first and second suspensions 702, 704 include two sets of PZT elements 706, 708 and 710, 712. As shown in FIG. 7, the first suspension 702 is located on a first side of the magnetic recording disk 700 and the second suspension 704 is located on the opposite side. In certain embodiments, any one or both of the first suspension's two sets of PZT elements 706, 708 can be configured to sense motion, while any one or both of the second suspension's two sets of PZT elements 710, 712 are simultaneously driven. This configuration permits a disk drive to sense disturbances of the shared magnetic recording disk 700 with one set of PZT elements while correcting for those disturbances by displacing or driving the other set of PZT elements. For example, when a read/write head on the first suspension 702 is active, either or both sets of the first suspension's PZT elements 706, 708 are driven while either or both sets of the second suspension's PZT elements 710, 712 sense motion, or vice versa. The sensing signal from the PZT set 710, 712 can be band-pass filtered around the important disk mode frequencies to obtain disk motion information for the shared or common disk. Further, by using the sensing PZT element pair 710, 712 in differential mode, the common-mode noise can be largely rejected. This whole operation can be reversed for the case when the head on second suspension 704 is active. This scheme allows sensing of disk modes that can then be used for compensation of disk modes using suitable feedforward schemes.

In general, certain embodiments provided herein can be implemented when the PZT elements are poled in opposite or the same direction.

In the various embodiments described above, in the suitable instances as mentioned herein, operating the PZT elements in tandem in a differential mode may reduce or nearly eliminate the effect of common-mode noise.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising:
   a first set of piezoelectric (PZT) elements poled in the same direction as a second set of PZT elements, the first and second sets of PZT elements configured to be driven while simultaneously sensing motion, wherein the first set of PZT elements is located on a first suspension on a first side of a disk, and wherein the second set of PZT elements is located on a second suspension on a second side of the disk; and
   a circuit configured to add outputs of the first and second sets of PZT elements, extract the sensed motion, and detect off-track motion from the extracted sensed motion.

2. The apparatus of claim 1, wherein a sensing signal is responsive to the sensing motion of the first and second PZT elements, and wherein the first and second PZT elements are responsive to a drive signal.

3. The apparatus of claim 2, wherein the circuit farther comprises:
   a filter configured to filter the drive and sensing signals of the first and second PZT elements into separate frequencies to allow the sensing signal o be isolated from the drive signal.

4. T The apparatus of claim 3, wherein the filter is configured to filter the drive signal into a low frequency band and a high frequency band.

5. The apparatus of claim 1, wherein the first and second PZT elements are located near a distal end of a suspension in a hard disk drive.

6. The apparatus of claim 1 wherein the first and second PZT elements are located between a first distal end of the suspension and an opposite, second distal end of the suspension.

7. The apparatus of claim 1,herein the first and second PZT elements are driven asymmetrically.

8. The apparatus of claim 7, wherein the first PZT element is configured to sense motion while the second PZT element is configured to be driven, during track-follow operations.

9. The apparatus of claim 1, wherein the circuit is configured to subtract signals from the first and second PZT elements from each other in a differential mode to reduce common-mode noise.

10. A method comprising:
    sensing a sensing signal responsive to a motion of a first set of PZT elements while simultaneously driving a second set of PZT elements responsive to a driving signal;
    combining the sensing signal and the driving signal to create a composite signal;
    extracting sensed motion from the composite signal; and detecting off-track motion from the extracted sensed motion,
wherein the first set of PZT elements is located on a first suspension on a first side of a disk in a hard disk drive, and wherein the second set of PZT elements is located on a second suspension on a second side of the disk.

11. The method of claim 10, further comprising:
filtering a driving signal of the plurality of PZT elements and a sensing signal of the plurality of PZT elements into separate frequencies to allow the sensing signal to be isolated from the driving signal.

12. The method of claim 11, wherein the filtering includes filtering the driving signal into a low frequency band and a high frequency band.

13. An apparatus comprising:
a first and second microactuator configured to be driven while simultaneously sensing motion, the first microactuator configured to output a first sensing signal responsive to a first microactuator deformation, the second microactuator configured to output a second sensing signal responsive to a second microactuator deformation;
a third microactuator element configured to output a third sensing signal responsive to a third microactuator deformation; and
a controller configured to subtract the third sensing signal from combined first and second sensing signals to generate a composite signal to detect off-track motion.

14. The apparatus of claim 13, wherein the first and second microactuators are driven asymmetrically.

* * * * *